United States Patent Office 3,486,830
Patented Dec. 30, 1969

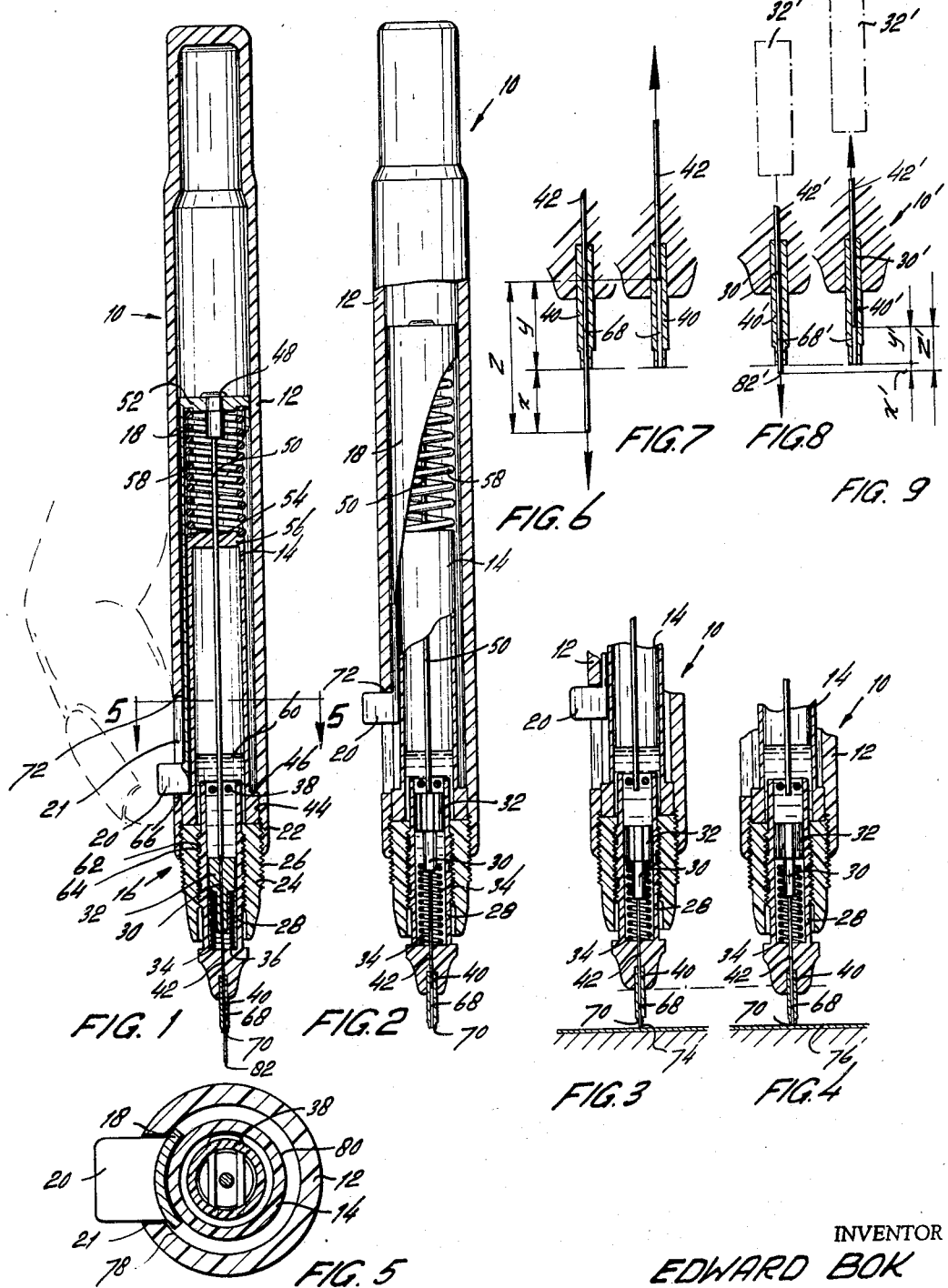

3,486,830
DRAFTING PEN WITH EXTENSIBLE TIP
Edward Bok, Falls Church, Va., assignor to Dike, Inc., Washington, D.C., a corporation of the District of Columbia
Filed Sept. 9, 1968, Ser. No. 758,304
Int. Cl. B43k 5/16
U.S. Cl. 401—260                8 Claims

ABSTRACT OF THE DISCLOSURE

A drafting pen or drawing instrument of the type embodying a holder, and ink reservoir supported in the holder and a cylindrical drafting pen tip with axial ink clearing needle extending from the reservoir outwardly of the holder. Structural innovations include a needle extension and retraction mechanism, so as to clear the ink capillary passage in the cylindrical tip from crystallized ink and, thus facilitate ink flow.

BACKGROUND OF THE INVENTION

Field of the invention

Contemporary drafting pens include for the most part a cylindrical hard metal tip and a clearing needle extending from the reservoir axially of the tip. The needle usually has a weight seated in the reservoir, so that a jerking movement of the pen will unseat the weight and actually reciprocate the needle within the ink-flowing capillary passage which extends from the reservoir through the cylindrical pen tip. This reciprocation of the needle clears the passage of crystallized ink, permitting a normal ink flow during the drawing. According to such pen structures, the clearing needle can be extended or retracted within the cylindrical pen tip only to a very small degree. As a result, it is not possible to completely clear the capillary passage of crystallized ink.

Description of prior art

The prior art devices have included mechanisms for extending and retracting the needle within the pen tip. However, the degree of extension or retraction has been slight and there has not been a positive means for clearing the capillary passage. See Buschle (2,805,645). In this device the crank shaft 6 and guide rod 3 are provided for reciprocating needle A within the pen tip 1. Reciprocation of the needle is limited to the extent of the offset 6 in the crank shaft and there is not provided a positive means for automatically retracting the needle.

See also Cholet (2,878,783). Here needle 23 is simply used as a sealing mechanism and there is not provided any means for longitudinally reciprocating needle 23 within the pen tip to the extent that crystallized ink may be completely removed. Also, there is not provided any means for automatically withdrawing the needle as it is desired to write.

SUMMARY OF THE INVENTION

According to the present invention, a drafting pen is provided with a somewhat conventional holder and ink reservoir with a cylindrical drafting pen tip supported at one end of the holder. An ink-flowing capillary passage extends from the reservoir through the cylindrical tip. A clearing needle is positioned axially of the capillary passage and usually includes a weight mounted within the ink reservoir. Uniquely provided are a tip compression spring mounted co-axially with the needle beneath the weight, so as to retract the needle within the tip and to damp writing vibrations. A manual override or extension mechanism is provided. The needle extension mechanism includes a stem mounted concentrically with the reservoir and having a rod extending through the reservoir and abutting the needle weight. A stem compression spring may be provided intermediate the reservoir and the stem. As the stem is depressed, the rod abuts the needle weight, thus extending the needle beyond the pen tip.

BRIEF DESCRIPTION OF THE DRAWINGS

FIG. 1 is a vertical sectional view of the present pen showing the needle extended to a maximum degree beyond its tip 42;

FIG. 2 is a similar sectional view showing thè needle initially withdrawn by spring means 58 to its maximum position of retraction within the tip;

FIG. 3 is a fragmentary sectional view, similar to FIG. 2, showing the retraction knob 20 and showing the needle 70 extending slightly beyond the tip due to the needle weight 32, slightly compressing tip compression spring 34;

FIG. 4 is a similar fragmentary sectional view, showing the needle as in FIG. 3 being inwardly displaced during writing by means of manual pressure;

FIG. 5 is a transverse sectional view, taken along section line 5—5 of FIG. 1 and showing the concentric mounting of reservoir stem and locking tab elements;

FIG. 6 is an enlarged fragmentary sectional view, showing the needle in full extension as in FIG. 1;

FIG. 7 is a similar fragmentary sectional view, showing the needle in full retraction as in FIG. 2;

FIG. 8 is a similar fragmentary sectional view of a conventional drafting pen, showing needle 42' in its position of fullest extension; and FIG. 9 is a similar fragmentary sectional view, showing the conventional needle 42' in its fullest retraction.

DESCRIPTION OF THE PREFERRED EMBODIMENT

In FIG. 1 a stylographic fountain pen 10 according to the invention is shown, which pen mainly consists of holder 12, ink cartridge 14, writing nib assembly 16 and holder circular stem 18 with the knob 20 thereof brought through longitudinal slot 21 of the holder 12.

Writing nib assembly 16 consists of plug 24 with its exterior screw thread 26 screwable in the bottom portion 22 of holder 12, and guide block 28 screwable within plug 24. The needle assembly 30 longitudinally is movable within guide block 28. Plug 24 includes, compression spring 34, which spring is placed around needle assembly 30 in between the needle weight 32 and bottom shoulder 36. Locking tab 38, prevents the needle assembly 30 from moving out of guide block 28, and the pen tip 40, in which the needle 42 of the needle assembly 30 is partly or totally movable.

With the aid of plug 24 bottom ring 44 of ink cartridge 14 is rendered leak free and contained within the holder seat 46.

By means of stud 48 the shaft 50 is connected with the top 52 of the stem 18, whereby this shaft longitudinally extends through the opening 54 in the tip 56 of the ink cartridge 14. Between the top 52 of the stem 18 and the top part 56 of the ink cartridge compression spring 58 is located.

Air entry to the ink cartridge 14, as this ink cartridge is partly filled with ink 60, can take place through air vent 62 positioned in the screw threads 64 of guide block 28.

In FIG. 1 knob 20 is moved downward to the notch 66, which notch is a part of bottom ring 44. Thereby the shaft 50 causes the needle assembly 30 to move downwards against the force of compression spring 34 and the needle 42 to protrude out of the pen tip 40. (See also the protruding length of needle 42 in FIG. 6.)

As the purpose of this downward movement is the starting of the ink flow through the capillary ink conduit 68, crystallized ink in this conduit 68 is totally or partly removed from this ink conduit 68 and deposited on the bottom exterior part 70 of pen tip 40.

In FIG. 2 the knob 20 is suddenly under the force of the compression spring 58 is moved suddenly upwards against notch 72 of slot 21, as the forefinger is removed from knob 20. This sudden movement results in a fast movement in the upward direction of the needle assembly 20 under the force of the compression spring 34, whereby the energy, delivered to the fast moving needle assembly, enables this assembly to move further upwards as far as the unretracted length of the pressure spring 34, to the top position for the needle assembly 30 as is shown in this FIGS. 2 and 7 with the upward movement of needle 42 in pen tip 40 over the distance y, and the total displacement of the needle 42 over the length z.

If the ink in the ink conduit 68 is not too heavy, the needle assembly 30 will then move downwards again under its own weight. If the needle assembly 30 sticks in its top position this needle assembly is moved downwards again by means of a second downward moving of the knob 20 with the aid of the forefinger. Thereafter, the above described movements of the needle assembly can be repeated.

Repeating of needle movements may be continued until the crystallized ink in the ink conduit has been removed to the extent that the ink flow through the ink conduit 68 is made possible. Then, with the knob 20 in its top rest position against notch 72 the needle assembly will adjust under its weight to the position, according to FIG. 3. The needle 42 now protrudes only over its part 74 from the bottom part 70 of the pen tip 40, because the needle weight 32 then rests upon the expanded compression spring 34.

By moving pen tip 40 over the drafting surface 76 as is indicated in FIG. 4, this protruding of the needle 42 is ended, the pen tip 40 now resting with its bottom part 70 on the drafting surface 76 and the needle assembly 30 being pushed into the holder 12.

Now drafting is possible and, if the interruptions in this drafting are of short duration, a slight shocking or jerking up and down of the holder 12 after each interruption with displacements of the needle assembly 30 by means of weight 32 is enough to start the ink flow through the ink conduit 68.

In FIG. 5 in a transverse sectional view, the position of the stem 18 in between the holder 12 and the ink cartridge 14 is shown whereby the inner wall 78 of the holder 12 and the outer wall 80 of the ink cartridge in combination with the slot 21 in holder 12 through which the knob 20 enters give guidance to the stem in its up and downward movements.

In FIGS. 8 and 9 displacements of the needle 42' in the pen tip 40' of a conventional drafting pen 10' are shown. These displacements are achieved by means of jerking up and down of this pen 10' resulting in the moving of the needle weight 32'.

In the rest position of the fountain pen 10' it is possible that the weight 32' has been moved to its top position as indicated in FIG. 9, especially if this pen is laid down. Ink crystallization then can take place in the ink conduit 68' over the length y' and, also, in the ink conduit around the needle 42' resulting in locking of needle assembly 30'.

This locking of the needle assembly is so strong that if, after a lengthy interruption in drawing, the ink flow through the conduit 68' is again desired it can take a long time (up to 5 minutes) with many manually performed up and downward jerkings of the pen 10' to achieve ink flow again.

Such a repeated manual up and down moving is very tiring and results in trembling forces brought over from the hand to the fountain pen during the first stage of drafting lines.

Needle 42 cannot be moved greater distances than $x'$ and $y'$. Needle 42 has to move upwards after each placing of the pen tip 40 on the drafting surface with the easy possibility of damage of the needle end 82'. Length $y'$ is really insufficient to cleanse passage 68 because of the possible ink crystallization in the pen tip 40 of over even a greater distance.

The resultant total displacement $z'$ therefore is limited and only a fraction of the possible displacement $z'$ of the fountain pen, according to the present invention.

In the present pen, starting of ink flow is achieved by a few repeated up and downward movements of the knob 20 with the forefinger, which is not tiring and results in total displacement of needle 42 over the distance z, readily freeing capillary passage 68 for ink flow.

I claim:
1. A drafting pen with extensible needle comprising:
 (A) a holder;
 (B) an ink reservoir supported in said holder;
 (C) a drafting pen tip communicating with said reservoir, said drafting pen tip and an axial needle extending outwardly from said holder;
 (D) a needle weight supported upon said needle interiorly of said housing and in pen drafting position urging said needle exteriorly of said tip including:
  (i) a tip compression spring, supported intermediate said weight and said pen tip so as to urge said weight apart from said tip in needle retraction positions; and
 (E) a needle retraction mechanism supported within said housing and abutting said weight in needle extension position and being retractable from said weight in needle retraction positions including:
  (i) a needle extension stem encircling and overriding said reservoir within said housing, and
  (ii) an axial rod extending from said stem through said reservoir to abut said needle weight, said stem and said rod being depressible against said weight to extend said needle beyond said housing in needle cleaning position and being retractable away from said weight, in needle writing position.

2. A drafting pen with extensible needle as in claim 1, said tip compression spring encircling said needle within said holder and said weight encircling said needle and axially aligned with said compression spring, said tip spring in compressed position being of greater force than said weight.

3. A drafting pen with extensible needle as in claim 1, said needle retraction mechanism including:
 (i) a stem compression spring supported intermediate said reservoir and said housing, and
 (ii) a reciprocable tab extending from said stem.

4. A drafting pen with extensible needle as in claim 3, said tip including:
 (i) a support piece mounting a cylindrical pen tip cartridge through which said needle extends, and
 (ii) a compression spring and weight reciprocating chamber extending from said tip through said housing and into said reservoir as an ink-flowing conduit intermediate said reservoir and said tip.

5. A drafting pen with extensible needle as in claim 4, said housing including:
 (i) a longitudinal slot accommodating said tab for vertical reciprocation during needle extension and retraction.

6. A drafting pen with extensible needle as in claim 5, said stem compression spring being axially aligned with said tip compression spring, so as to remove longitudinally said stem said rod from said needle weight.

7. A drafting pen with extensible needle as in claim 6, said needle weight being greater than the compressive moment of said tip compression spring so as to extend said needle beyond said pen tip in needle rest position.

8. A drafting pen with extensible needle as in claim 7, said axial rod being urged by said stem compression spring apart from said needle weight in needle writing position, enabling the weight to move upward in said reservoir as pressure is applied to said needle end.

References Cited

UNITED STATES PATENTS 3,020,884   2/1962   Riepe et al. _____ 401—259

FOREIGN PATENTS 993,094   7/1951   France.

LAWRENCE CHARLES, Primary Examiner